US012568952B2

(12) United States Patent (10) Patent No.: US 12,568,952 B2

Gauker et al. (45) Date of Patent: Mar. 10, 2026

(54) BAIT APPARATUS FOR ANIMAL CAGE TRAP AND METHOD OF BAITING USING THE SAME

(71) Applicant: Woodstream Corporation, Lancaster, PA (US)

(72) Inventors: Andrew Gauker, Mohnton, PA (US); Marko Lubic, Shillington, PA (US); David Swift, Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 164 days.

(21) Appl. No.: 16/858,131

(22) Filed: Apr. 24, 2020

(65) Prior Publication Data

US 2020/0337294 A1     Oct. 29, 2020

Related U.S. Application Data

(60) Provisional application No. 62/839,211, filed on Apr. 26, 2019.

(51) Int. Cl.
A01M 23/18         (2006.01)
E05F 1/00          (2006.01)

(52) U.S. Cl.
CPC ............. A01M 23/18 (2013.01); E05F 1/002 (2013.01)

(58) Field of Classification Search
CPC ...... A01M 23/00; A01M 23/16; A01M 23/18; A01M 25/002; A01M 25/004
USPC ........................................................ 220/242
See application file for complete search history.

(56) References Cited

U.S. PATENT DOCUMENTS 240,896 A * 5/1881 Dibble .................. A01M 1/106
                                                 43/118
857,176 A * 6/1907 Hubbell .................. H02G 3/14
                                                 220/242
1,439,200 A * 12/1922 Strausbaugh ......... A01M 23/00
                                                 43/69

(Continued)

OTHER PUBLICATIONS

Bullant (https://web.archive.org/web/20160402102119/https://bullantperformance.com.au/what-are-dzus-fasteners/, Apr. 2016) (Year: 2016).*

(Continued)

*Primary Examiner* — Peter M Poon
*Assistant Examiner* — Carly W. Lynch
(74) *Attorney, Agent, or Firm* — Barley Snyder

(57)                ABSTRACT

A live catch animal cage trap having a multi-use bait apparatus in a rear end of the trap is provided. The bait apparatus includes a base plate secured to the rear end of the trap and a cover. The base plate has a cutout that is operative with an opening in the wire mesh of the trap rear end to enable the user to reach into the trap interior through the aligned cutout and opening, while the cover closes the cutout and opening for use. The bait apparatus preferably also includes a removable receptacle having a side wall, an apertured front wall, and an open back. With the side wall and front wall being inserted through the cutout and opening, bait is placed into the receptacle through the open back which is then blocked by closing the cover to enclose the bait while allowing the scent thereof to escape through the apertured front wall to attract a target animal to be trapped. The cover may be further provided with apertures to increase bait odor dissemination.

21 Claims, 9 Drawing Sheets

(56)                References Cited

U.S. PATENT DOCUMENTS

| | | | | | |
|---|---|---|---|---|---|
| 1,488,769 | A | * | 4/1924 | Vining | A01M 23/00 |
| | | | | | 43/70 |
| 1,592,397 | A | * | 7/1926 | Vail | A01M 23/18 |
| | | | | | 43/69 |
| 1,662,275 | A | * | 3/1928 | Lane | H02G 3/123 |
| | | | | | 439/142 |
| 2,123,471 | A | * | 7/1938 | Lewis | A01M 23/00 |
| | | | | | 43/65 |
| 2,446,168 | A | * | 8/1948 | Bricker | A01M 23/14 |
| | | | | | 43/61 |
| 2,506,953 | A | * | 5/1950 | Dzus | F16B 5/10 |
| | | | | | 411/555 |
| 2,780,024 | A | * | 2/1957 | Mckim | A01M 23/18 |
| | | | | | 43/70 |
| 3,624,951 | A | * | 12/1971 | Gilbaugh | A01M 23/18 |
| | | | | | 160/4 |
| 3,792,414 | A | * | 2/1974 | Smith | H02G 3/14 |
| | | | | | 220/242 |
| 3,811,004 | A | * | 5/1974 | Moore | H02G 3/14 |
| | | | | | 174/67 |
| 4,381,063 | A | * | 4/1983 | Leong | H02G 3/14 |
| | | | | | 174/67 |
| 4,453,337 | A | * | 6/1984 | Williams | A01M 25/004 |
| | | | | | 119/51.01 |
| 4,468,883 | A | * | 9/1984 | Williams | A01M 23/18 |
| | | | | | 43/67 |
| 4,637,162 | A | * | 1/1987 | Sherman | A01M 25/004 |
| | | | | | 43/131 |
| 4,979,634 | A | * | 12/1990 | Begley | H01H 9/287 |
| | | | | | 174/67 |
| 5,218,169 | A | * | 6/1993 | Riceman | H01R 13/447 |
| | | | | | 174/67 |
| 5,235,778 | A | * | 8/1993 | Sutherlin | A01M 23/18 |
| | | | | | 43/61 |
| 5,347,747 | A | * | 9/1994 | Henriques | A01M 23/18 |
| | | | | | 43/61 |
| 5,527,993 | A | * | 6/1996 | Shotey | H02G 3/088 |
| | | | | | 174/67 |
| 5,571,023 | A | * | 11/1996 | Anthony | H02G 3/14 |
| | | | | | 439/142 |
| 5,573,412 | A | * | 11/1996 | Anthony | H01R 13/6397 |
| | | | | | 220/242 |
| 6,313,980 | B1 | * | 11/2001 | Craft | H02B 1/01 |
| | | | | | 361/627 |
| 6,938,368 | B2 | * | 9/2005 | Guidry | A01M 23/08 |
| | | | | | 43/72 |
| 7,757,427 | B2 | | 7/2010 | Bucher | |
| 9,980,476 | B2 | * | 5/2018 | Miyawaki | A01M 23/20 |
| 2010/0018105 | A1 | * | 1/2010 | Gauker | A01M 23/30 |
| | | | | | 43/61 |
| 2014/0020278 | A1 | * | 1/2014 | Smith | A01M 23/24 |
| | | | | | 43/79 |
| 2017/0105400 | A1 | * | 4/2017 | Gillihan | A01K 97/05 |
| 2017/0112119 | A1 | * | 4/2017 | Novatney | A01M 23/02 |
| 2017/0251653 | A1 | * | 9/2017 | Frink | A01K 97/05 |
| 2018/0325094 | A1 | * | 11/2018 | Dolshun | A01M 23/20 |
| 2020/0214275 | A1 | * | 7/2020 | Brawn | |
| 2020/0253187 | A1 | * | 8/2020 | Files | A01M 31/002 |

OTHER PUBLICATIONS

HBH (Screen captures from YouTube video clip entitled "Installing Dzus Fasteners," 3 pages, uploaded on Feb. 17, 2016 by user "HomebuiltHELP". Retrieved from the internet: <https://www.youtube.com/watch?v=9wf4j1dnlAw&t=66s>) (Year: 2016).*

* cited by examiner

BAIT APPARATUS FOR ANIMAL CAGE TRAP AND METHOD OF BAITING USING THE SAME

CROSS-REFERENCE TO RELATED APPLICATION

This application claims priority under 35 U.S.C. § 119 to U.S. Provisional Patent Application No. 62/839,211, filed Apr. 26, 2019.

FIELD OF THE INVENTION

This invention relates to cage-type animal traps of the kind generally used outdoors for trapping small to medium sized animals using bait placed inside the trap.

BACKGROUND

Wire mesh cage traps have been used for decades as a means of trapping problem animals so that they can be relocated and released at another location without harm. Such traps commonly comprise a cage of metal wire mesh or the like with an entry door at a forward end of the trap and a closed rearward end. The entry door is held open by a trigger mechanism until an animal is lured into the trap by suitable bait which is placed between the rearward end of the trap and the trigger mechanism as part of the trap setting procedure. After the animal enters the interior of the trap to reach the bait, the animal's weight pressing against the trigger actuates a trip or trigger mechanism which releases and closes the entry door, thereby trapping the animal inside the cage. Traps of this type include the Havahart® Model 1079 and the Havahart® EASY SET® live animal cage traps, both of which are manufactured and sold by Wood-stream Corporation of Lititz, Pennsylvania, which is the assignee of the instant invention. The Havahart® EASY SET® live animal cage trap is described and illustrated in U.S. Pat. No. 7,757,427 ("the '427 patent"), the disclosure of which is hereby incorporated by reference as if fully set forth herein in its entirety.

Cage traps like the Havahart® Model 1079 and Havahart® EASY SET® live animal cage traps must be made long enough to accommodate the target animal and ensure that the animal is fully within the trap when the entry door closes. Since the rearward end of the trap is typically closed, i.e., does not have a door, the length of the trap can make it difficult for the user to place the bait between the rearward end of the trap and the trigger mechanism by reaching through the entry door. Therefore, to facilitate baiting, it would be desirable to have a point of access, such as a bait door, in the rearward end of the trap.

SUMMARY

In view of the foregoing, the present invention is directed to a cage-type animal trap that includes a wire mesh animal enclosure defined by a trap body made up of a base, a pair of opposed sidewalls emanating from the base, a rear wall secured to the sidewalls and the base, a roof secured to the tops of the sidewalls and the rear wall, and a front end defined by the base, sidewalls, and roof which is provided with an animal access opening. An entry door is movably mounted at the front end and operates in an opened position to reveal the animal access opening and in a closed position to block the animal access opening. The end of the trap opposite the front end is referred to herein as the rear end, with the term "rear end" intended to include the rear wall as well as adjacent rearward portions of the sidewalls and roof.

The trap also has a setting mechanism that is coupled to a trip mechanism for initiating activation of trap closure. When tripped, a torsion spring or other mechanism urges the entry door toward its closed position. Once closed, a locking yoke is typically provided that prevents an animal caught within the trap from forcing the entry door open from inside the trap.

To enable the user to more easily bait the trap, the present invention includes a multi-use bait apparatus positioned in the rear end of the trap, and preferably mounted in the rear wall thereof. The multi-use bait apparatus preferably includes a base plate having a cutout that is operative with an opening in the wire mesh of the trap rear end to enable the user to reach into the trap interior through the aligned cutout and opening.

The multi-use bait apparatus also includes a removable receptacle having an apertured front wall, an open back and a side wall, and a hinged cover for selectively exposing and closing the open back of the receptacle in order to place and enclose bait therein, respectively. When closed, the hinged cover is secured using a fastening element secured to the base plate and/or to the wire mesh of the cage trap.

To configure the trap for use according to a first embodiment, bait is placed within the receptacle and the receptacle is fitted within the cutout so that the side wall of the receptacle projects through the wire mesh opening to place the apertured front wall within the trap interior. The hinged cover is then secured in a closed position over the open back. The odor of the bait held within the receptacle is thus made readily detectable within the trap interior via the apertures in the front wall of the receptacle to draw target animals into the trap body. At the same time, the receptacle protects the bait from being stolen or otherwise compromised by the actions of an animal outside of the trap. Enclosing of the bait also allows the same bait to be used multiple times since the animal cannot consume the bait either before or after being trapped.

According to a second embodiment, the base plate and hinged cover may be used without the receptacle. In this case, the user can reach into the trap interior through the aligned base plate cutout and opening in the wire mesh to place bait inside the trap at the rearward end thereof, and then close the hinged cover to block off the rear end of the trap during use.

It is therefore an object of the present invention to provide an animal cage trap with a multi-use bait apparatus and a method of baiting that enables the user to bait the rear end of the trap without having to reach through the entry door.

Another object of the present invention is to provide an animal cage trap with a multi-use bait apparatus in accordance with the preceding object in which the bait apparatus includes a base plate having a cutout that aligns with an opening in the wire mesh at the rear end of the cage trap, and a cover for closing off the rear end when the trap is in use, the aligned cutout and opening enabling the user to reach into the trap interior from the rear end of the trap.

Still another object of the present invention is to provide an animal cage trap with a bait apparatus in accordance with the preceding object in which the cover is hingedly mounted on the base plate.

Yet another object of the present invention is to provide an animal cage trap with a multi-use bait apparatus in accordance with at least one of the preceding two objects in which the bait apparatus further includes a receptacle that is received within the aligned cutout and wire mesh opening, the receptacle having an open back with side and front walls to contain a quantity of bait, at least one of the side and front walls having apertures that allow bait odor to be dispersed into the trap interior, and the open back being blocked by the cover when the trap is in use.

A further object of the present invention is to provide an animal cage trap with a bait apparatus adjacent the rear end of the trap, the bait apparatus including an opening in the wire mesh at the rear of the trap and a cover for blocking the opening when the trap is in use.

Yet a further object of the present invention is to provide an animal cage trap with a bait apparatus in accordance with the preceding object in which the cover is hingedly mounted to the cage trap, the opening being large enough to give the user hand access into the interior of the trap through the opening, the hinged cover being secured in the closed position with one or more fasteners when the trap is in use.

Still another object of the present invention is to provide an animal cage trap with a bait apparatus in accordance with the preceding object in which the bait apparatus further includes a base plate to which the cover is mounted, the base plate being secured to the trap and having a cutout that aligns with the opening in the wire mesh.

Yet another object of the present invention is to provide an animal cage trap with a bait apparatus in accordance with the preceding object in which the bait apparatus further includes a receptacle that is removably received within the aligned cutout and wire mesh opening, the receptacle having an open back with side and front walls to contain a quantity of bait, at least one of the side and front walls having apertures that allow bait odor to be dispersed into the trap interior, and the open back being blocked by the cover when the trap is in use.

Another object of the present invention is to provide an animal cage trap with a bait apparatus that includes an opening in the rear end of the trap, a removable receptacle received within the opening, the receptacle having a side wall, an apertured front wall and an open back, and a hinged cover for selectively exposing and closing the open back of the receptacle in order to place and enclose bait therein, respectively, the hinged cover being secured using fastening elements secured to the base plate and/or to the wire mesh of the cage trap when the cover is closed.

Yet another object of the present invention is to provide an animal cage trap with a bait apparatus according to the preceding object in which the hinged cover includes an integrally formed receptacle having an apertured back wall, the cover with integral receptacle being usable with or without the removable receptacle to accommodate various baiting configurations.

Still another object of the present invention is to provide a method of baiting an animal cage trap using a multi-use bait apparatus having a removable receptacle fitted within an opening in the rear end of the trap, the method including placing bait within the receptacle through an open back thereof at the rear end of the trap and then closing the open back with a cover to enclose the bait when the trap is in use.

Yet another object of the present invention is to provide a method of baiting an animal cage trap using a bait apparatus in accordance with the preceding object in which the cover is pivotally mounted on a hinged joint and secured to the cage trap using a fastening element.

A further object of the present invention is to provide an animal cage trap having a bait apparatus that allows the trap to be baited from the rear end opposite the trap entry door, the cage trap and bait apparatus being economical to manufacture, easy to use, and reliable and durable in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
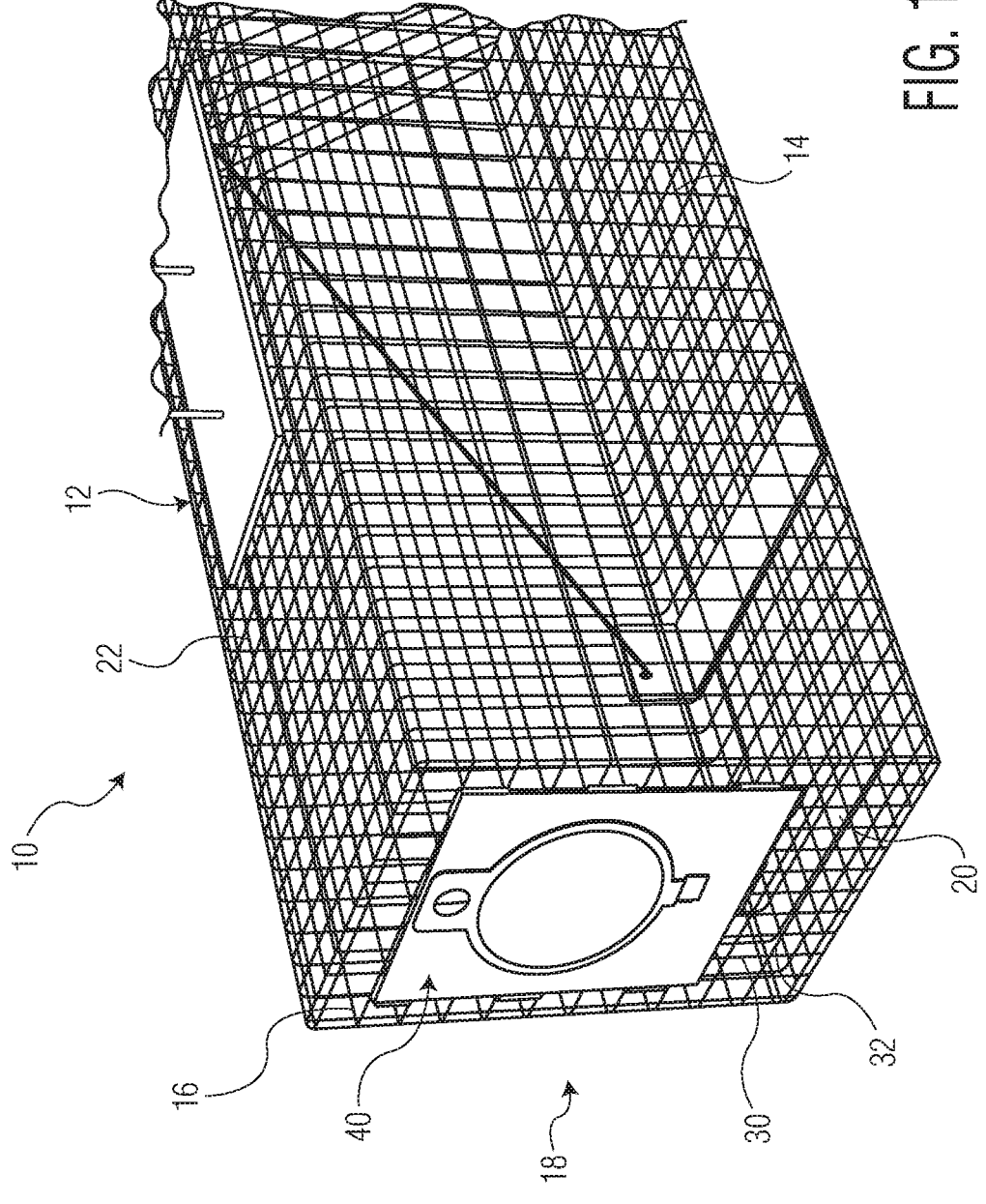
FIG. 1 is a partial rear perspective view of an animal cage trap having a bait apparatus in accordance with a first embodiment of the present invention.

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 4:
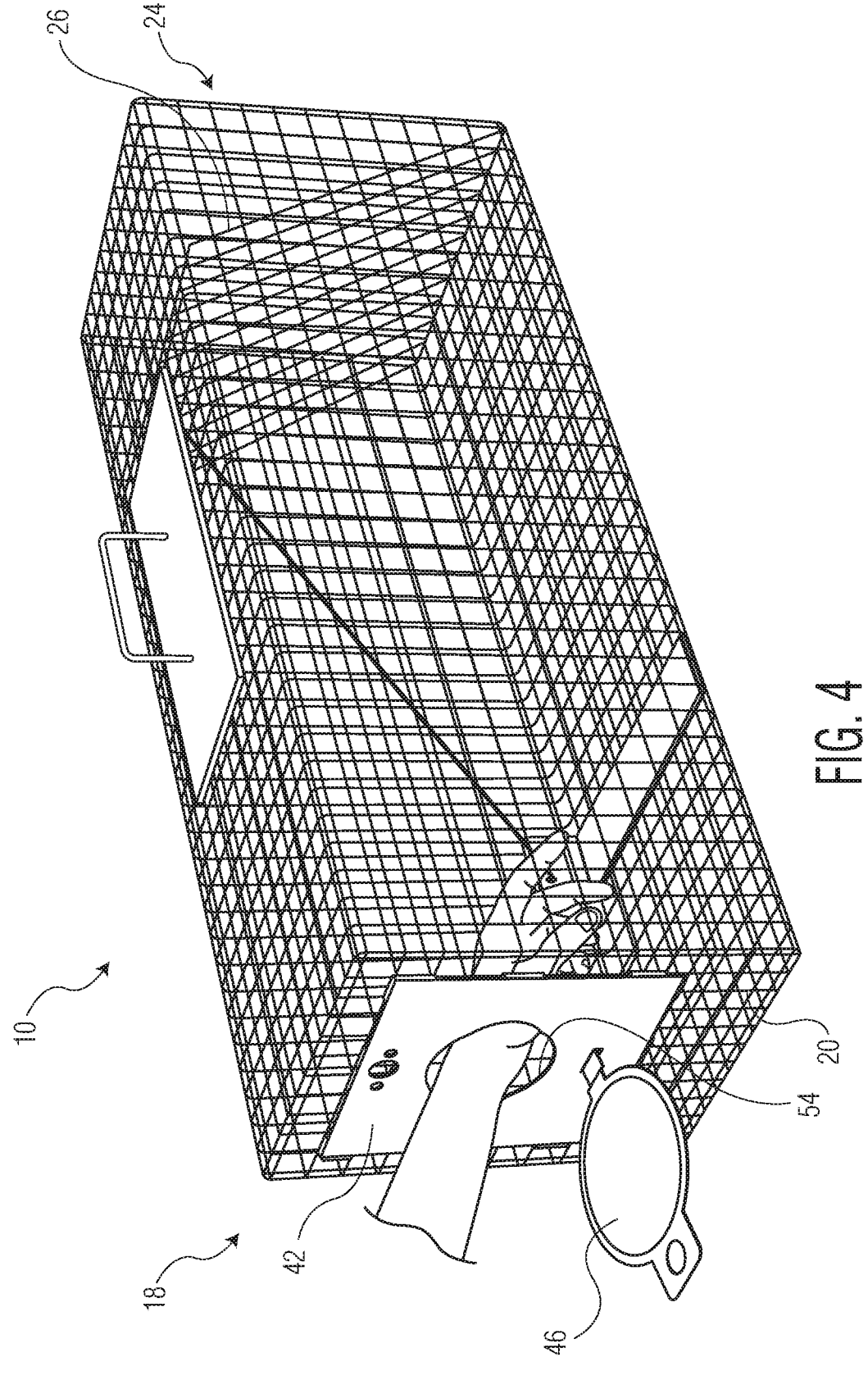
FIG. 4 is a rear perspective view of an animal cage trap having a bait apparatus like that shown in FIG. 1 but in use without the receptacle to allow hand access into the rear end of the trap in accordance with a second embodiment of the present invention.

An animal cage trap having a bait apparatus according to the present invention is shown in FIGS. 1-4 and generally designated by reference numeral 10. The cage trap 10 includes a trap body generally designated by reference numeral 12, having a base 14, a pair of opposed sidewalls 16 emanating from the base, a rear end generally designated by reference numeral 18 that includes a rear wall 20 secured to the sidewalls and the base, a roof 22 secured to the tops of the sidewalls and the rear wall, and a front end, generally designated by reference numeral 24, that is provided with an animal access opening. The animal access opening is preferably defined by the base, sidewalls and roof. When the trap is tripped, as shown in FIG. 4, the animal access opening is covered by an entry door 26. For the purposes of description, "front" and "forward" as used herein are intended to correspond with the front end 24 of the trap while "rear" and "rearward" refer to the rear end 18 of the trap. As noted previously herein, unless otherwise stated, the term "rear end 18" includes the rear wall 20 as well as adjacent rearward portions of the sidewalls and roof. At least the rear wall 20 is formed by a plurality of vertically extending wire bars 30 connected by a plurality of transverse horizontally extending wire bars 32.

The entry door 26 is movably mounted at the front end 24 of the trap and operates in an opened position to reveal the animal access opening and in a closed position to block the animal access opening. The components of the trap which are operative to trap and contain an animal correspond with those found in the Havahart® Model 1079 trap which has been commercially available for many years.

Figure 2:
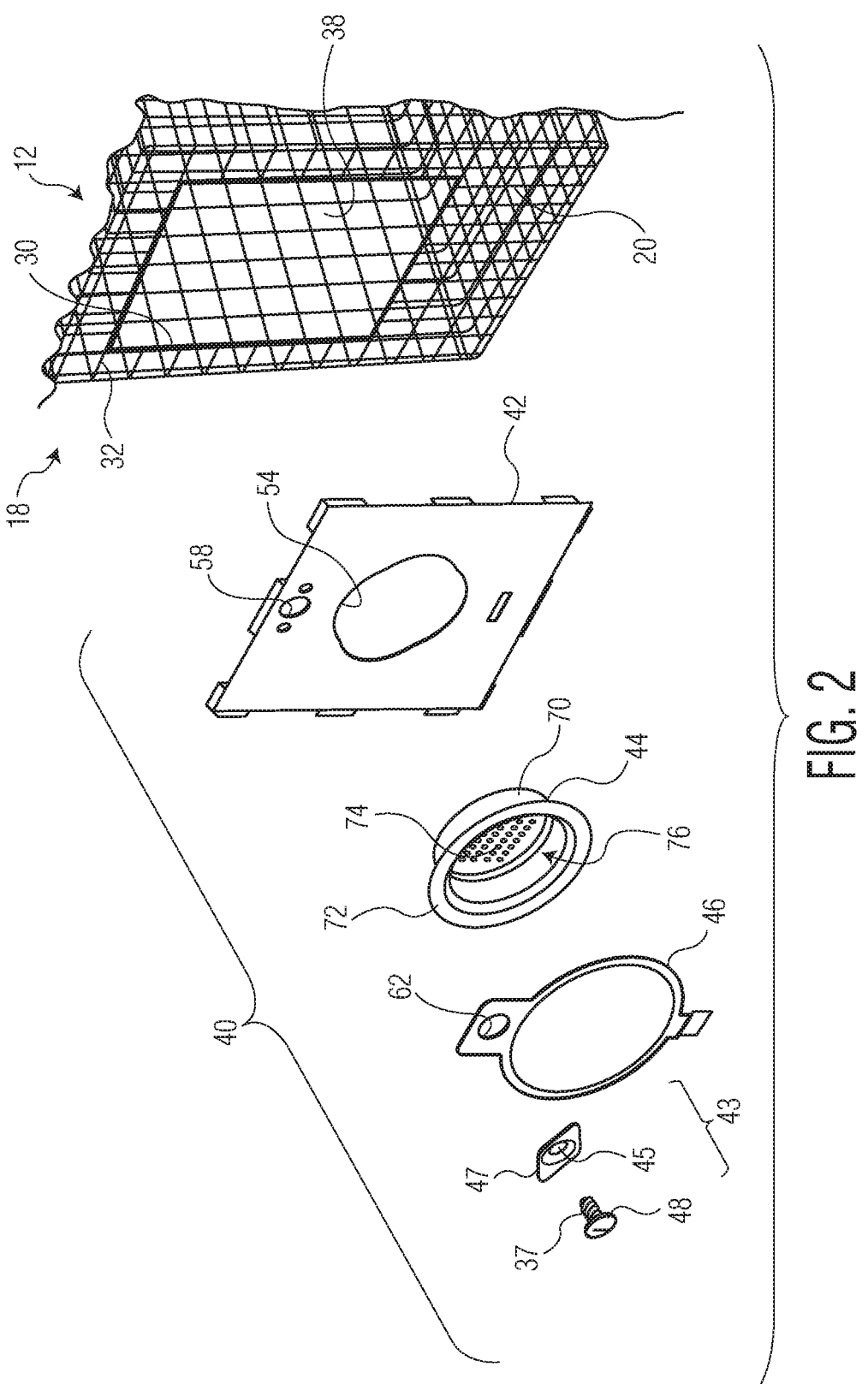
FIG. 2 is an exploded view of the components of the bait apparatus shown in FIG. 1.
Figure 3:
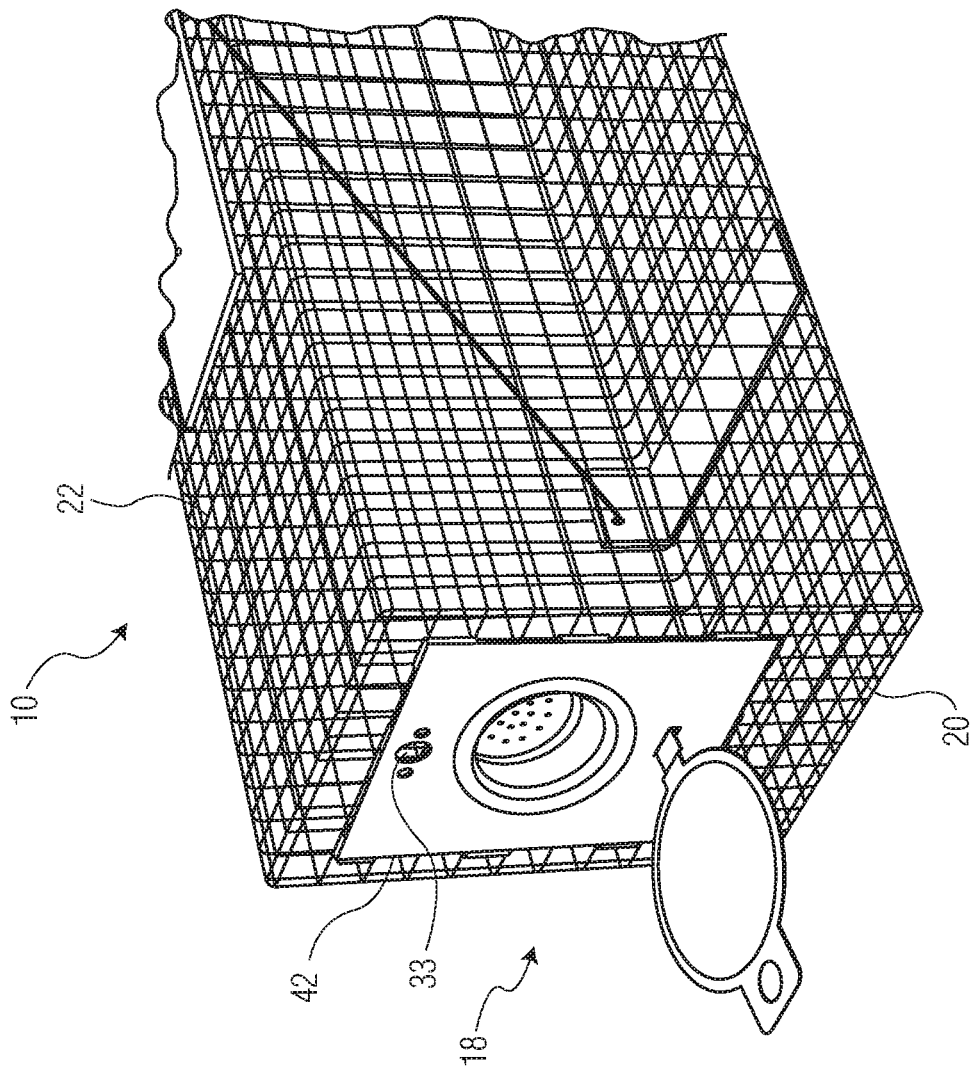
FIG. 3 illustrates the bait apparatus shown in FIG. 1 with the cover open and the receptacle in place.

As shown in FIG. 2, the rear wall 20 of the trap 10 according to the present invention has an opening 38 formed therein. Alternatively, the opening 38 could be formed in other areas of the rear end 18 including an adjacent part of either side wall 16 or the roof 22. With these various locations being understood to be part of the present invention, the opening 38 will be identified hereafter as being in the rear wall 20 for description purposes.

According to the first embodiment shown in FIGS. 1-4, the rear wall 20 of the trap 10 is provided with a bait apparatus generally designated by reference numeral 40. As shown in the exploded view of FIG. 2, the bait apparatus 40 includes a base plate 42, a receptacle 44, a cover 46 and one or more fastening components 43. The bait apparatus 40 works cooperatively with the opening 38 to enable the user to bait the trap from the rear end 18 as will be further described hereinafter.

Figure 5:
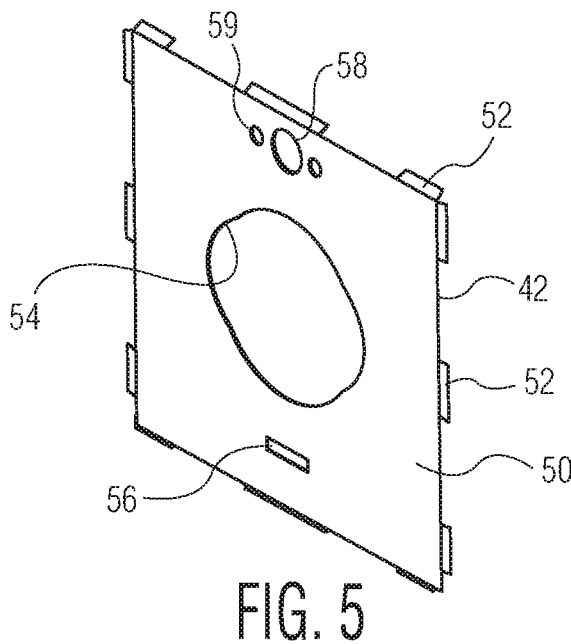
FIG. 5 is an isolated perspective view of the base plate of the bait apparatus shown in FIGS. 1-4.

As shown in isolation in FIG. 5, the base plate 42 includes a generally planar body 50 with edge fasteners 52 that are used to secure the base plate to adjoining wire bars 30 and 32 on the rear wall 20. A cutout 54 is formed in the center area of the planar body 50 and is aligned with the opening 38 to provide hand access to the trap interior when the base plate is mounted over the opening 38 as shown in FIG. 4. According to the preferred embodiment shown, the cutout 54 is ergonomically shaped to best accommodate the user's hand when reaching into the trap interior to place bait therein.

Figure 6:
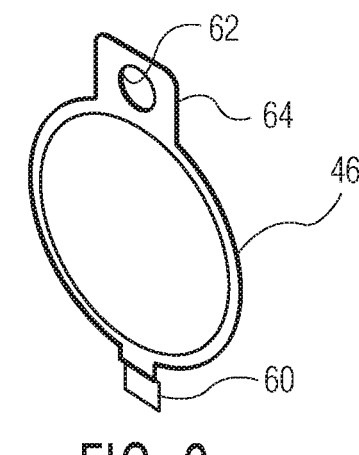
FIG. 6 is an isolated perspective view of the cover of the bait apparatus shown in FIGS. 1-4.

To couple the cover 46 to the base plate 42, a slot 56 is located under the cutout 54. The slot 56 is configured to receive a bent tab 60 formed on the cover 46 by which the cover, shown in isolation in FIG. 6, is mounted in hinged relationship on the base plate 42. The base plate 42 also includes an upper hole 58 with two smaller holes 59 on either side that receive rivets or the like that are typically used to secure a fastener 43 such as a DZUS®, or similar, quarter-turn fastener having a mounting plate 47 and a plunger 48. The upper hole 58 aligns with an aperture 62 on a flange 64 of the cover 46 and with the opening 45 in the mounting plate 47 of the quarter-turn fastener 43 (see FIG. 2). The plunger 48 extends through the aligned aperture 62, the opening 45 and the upper hole 58 to secure the cover 46 in a closed position, as shown in FIG. 1.

Figure 8:
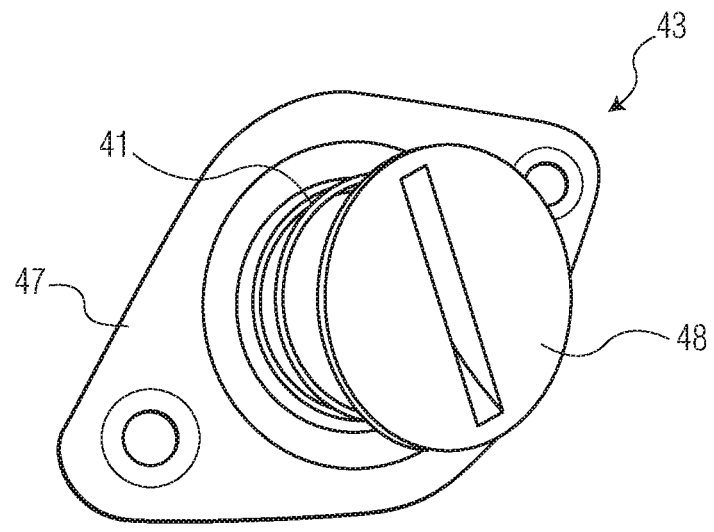
FIG. 8 is a front perspective view of the quarter-turn fastener shown in FIGS. 1-4.
Figure 9:
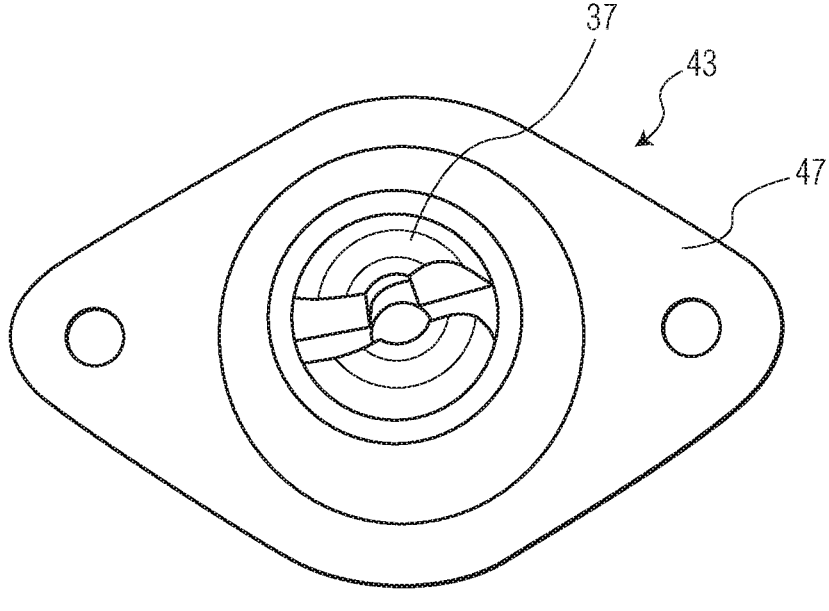
FIG. 9 is a rear view of the quarter-turn fastener shown in FIG. 8.

Isolated views of an assembled fastener 43 suitable for use with the present invention are provided in FIGS. 8 and 9. The plunger 48 of the fastener 43 is mounted with a spring 41 (not shown in FIG. 2) to obtain the known "push-to-close, turn-to-open" operation of a DZUS® type fastener. As used in conjunction with the mesh cage trap 10, the inner end 37 of the plunger 48 engages with a cage trap vertical bar 33 that is accessed through the cutout 58 (see FIGS. 3 and 10). Fasteners of this type are commercially available from many sources and provide for easy repeatable opening and closing of the bait apparatus. However, fasteners of other types could also be used as would be understood by those skilled in the art.

Figure 7:
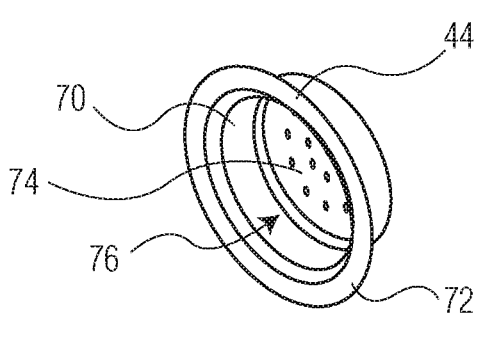
FIG. 7 is an isolated perspective view of the receptacle of the bait apparatus shown in FIGS. 1-3.

As shown in isolation in FIG. 7, the receptacle 44 has a side wall 70 with a flange 72 defined about a perimeter thereof, and an apertured front wall 74 to contain a quantity of bait (not shown). The bait is placed within the receptacle 44 through the open back 76 thereof. Once the side wall 70 of the receptacle 44 is fitted within the cutout 54 with the flange 72 against the base plate 42 (see FIG. 3), the open back 76 is then blocked by closing the cover 46 and securing the cover with the fastening component 43, as shown in FIG. 1. By enclosing the bait, the receptacle 44 and cover 46 protect the bait from being stolen or otherwise compromised by the actions of an animal outside of the trap, while also allowing the same bait to be used for several trap settings if desired.

According to a second embodiment, the trap 10 and bait apparatus 40 may be used with the base plate and cover 46 alone, and the receptacle 44 omitted, as shown in FIG. 4. In this configuration, the user can reach through the aligned cutout 54 and opening 38 to access the interior of the trap for bait placement therein.

Figure 10:
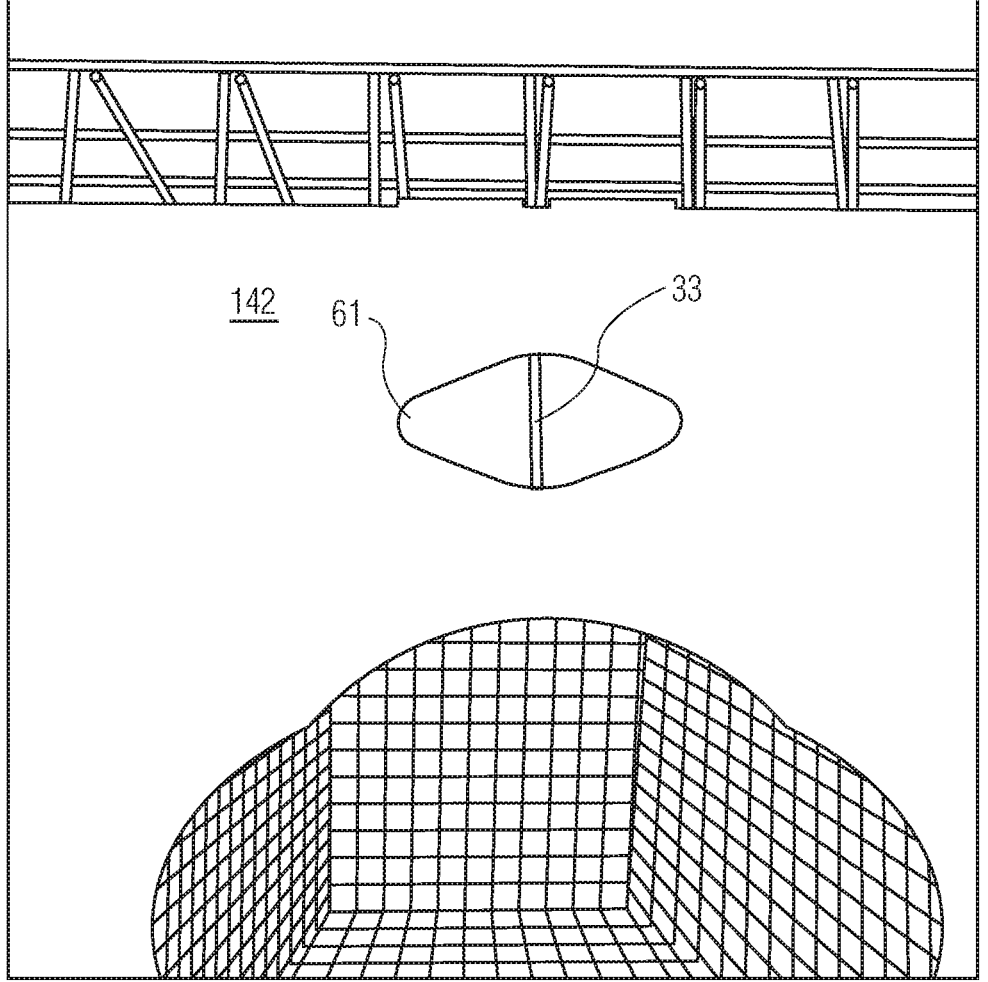
FIG. 10 is a partial rear view of a base plate mounted on a wire mesh trap according to a third embodiment of the present invention, the base plate having an alternate configuration by which the center hole with two smaller rivet holes on either side has been replaced with a single cutout.
Figure 11:
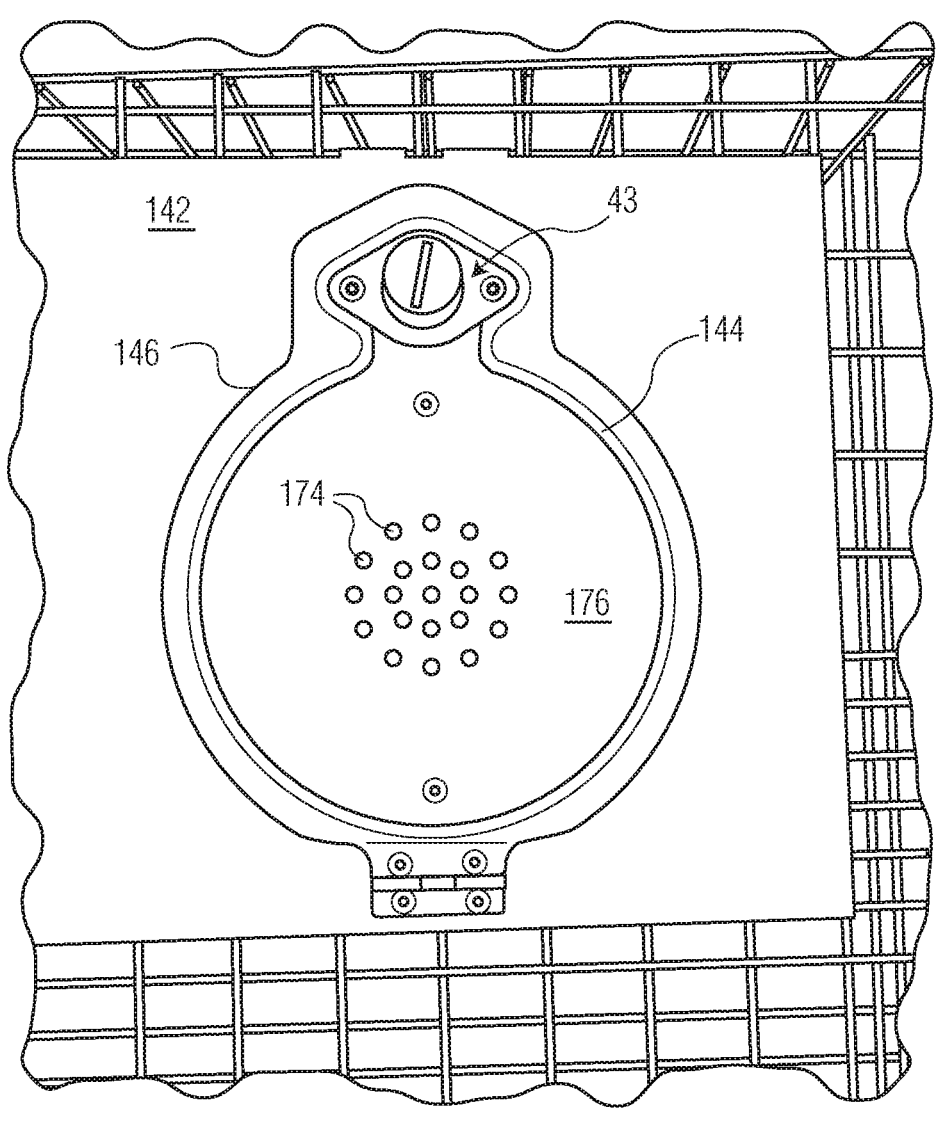
FIG. 11 is a partial rear view showing the base plate of FIG. 10 with the single cutout closed by the cover and secured to the trap using a quarter-turn fastener, the cover including an integrally formed receptacle.
Figure 12:
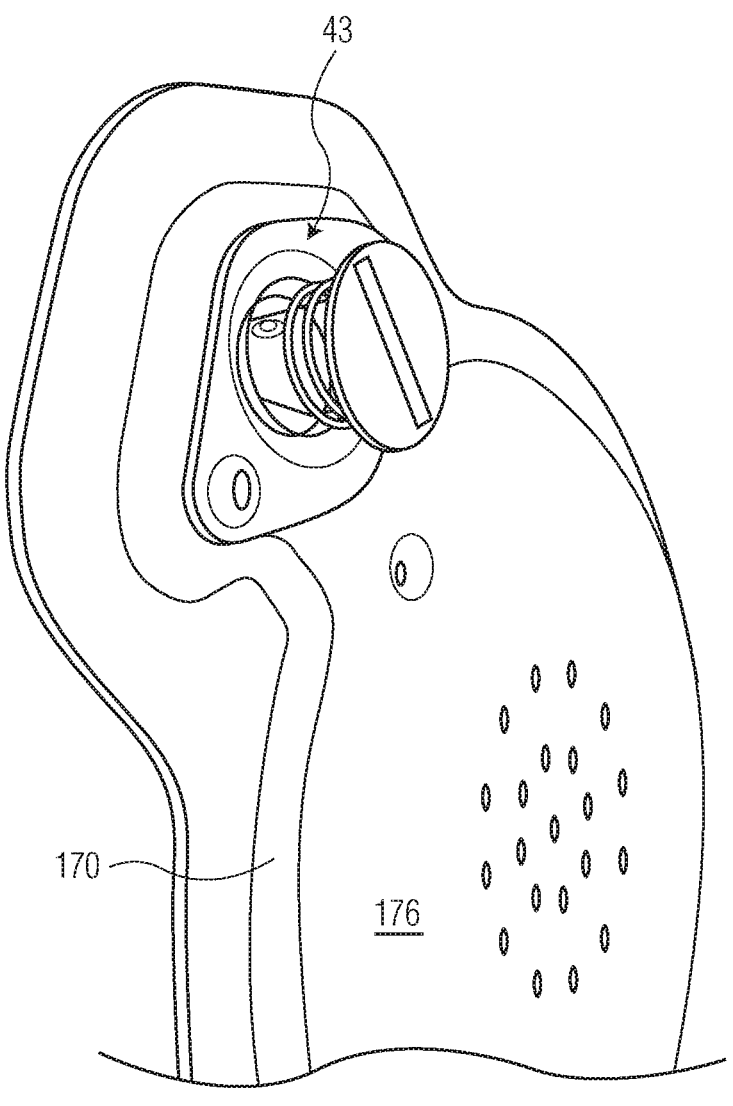
FIG. 12 is a partial perspective view showing a perspective view of the cover and integrated receptacle shown in FIG. 11.

A third embodiment of the bait apparatus is shown in FIGS. 10-12. For sake of brevity, only those elements that differ from the aforementioned embodiment will be described. As illustrated, a base plate 142 has an alternate configuration by which the center hole with two smaller rivet or fastener holes on either side has been replaced with a single cutout 61. This base plate configuration simplifies the manufacturing process while retaining full functionality and may be incorporated within either or both of the first and second embodiments. A cover 146 according to the third embodiment is formed to include an integrally formed receptacle 144 and may be used with or without the removable receptacle 44. The integral receptacle 144 is preferably a stamped steel part and includes a side wall 170 that projects rearwardly and a back wall 176 with apertures 174 formed therein as shown in FIGS. 11 and 12.

The integral receptacle 144 may be used effectively with sticky baits, such as peanut butter, that can be smeared onto the inner surface of the back wall 176 to be accessed from inside the trap body, while the apertures 174 ensure the odor of the bait is readily detected from outside of the trap. In an alternative embodiment, not shown, the removable receptacle 44 may be used in combination with the cover 146, with the geometry of the cover 146 accommodating the flange 72 of the removable receptacle 44 to allow the perimeter of the cover to seal flat against the base plate 142 when the cover is closed. Additionally, the apertures 174 work in conjunction with the separate receptacle 44 and its apertured front wall 74 to ensure the bait odor can be detected from multiple sides. As in the first and second embodiments, and whether used with or without the separate receptacle 44, the cover 146 according to the third embodiment is closed and secured to the trap using the quarter-turn fastener 43. As a further alternative, the bait apparatus may be constructed without a base plate, with the hinged cover being mounted directly to the trap body (not shown).

The foregoing descriptions and drawings should be considered as illustrative only of the principles of the invention.

The invention may be configured in a variety of shapes and sizes and is not limited to the three preferred embodiments disclosed herein. The concepts disclosed herein may be modified to suit other specific trap designs as may be apparent to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A live catch animal trap comprising:

an animal enclosure having a trap body and an animal access opening facilitating entry into a vacant interior sized to receive an animal to be trapped;

an entry door movably mounted at the access opening, the entry door operative in an opened position to reveal the animal access opening and in a closed position to block the animal access opening;

a setting mechanism for fixing the door in the opened position;

a trip mechanism that when activated allows the door to move to the closed position; and a bait apparatus mounted at a rear end of the trap and enabling a user to bait the trap without accessing the animal access opening, the bait apparatus including:

a planar base plate mounted to an exterior wall of the trap body on a rear face of the planar base plate, the base plate defining a cutout aligned with and secured over an opening in the exterior wall of the trap body;

a receptacle arranged within the cutout for holding a portion of bait and including an apertured front wall, a sidewall extending around a perimeter of the front wall, and a flange extending outward from the sidewall on an end opposite the front wall; and a cover selectively securable on and directly flush simultaneously to an exterior side of the planar base plate and to the receptacle, the cover movable between a closed position in which the cover is arranged over the cutout, and an open position in which the cutout is exposed to an external environment, wherein:

the base plate and the cover each define a fastener opening formed therethrough;

the fastener openings of the base plate and the cover are aligned with the cover in the closed position and expose a wire of the enclosure therethrough;

a shared fastener extends through the cover and the base plate with the cover in the closed position, the shared fastener including a fastening end engaging with the exposed wire for securing the cover in the closed position;

the base plate defines a slot on a front face opposite the rear face, the slot disposed opposite the fastener opening; and the cover defines a bent tab having a free end adapted to engage with and extend through the slot to a rear of the base plate for allowing the cover to move between the open and the closed position with the tab retained within the slot.

2. The animal trap as set forth in claim 1, wherein the exterior wall is a rear wall of the trap body opposite the entry door.

3. The animal trap of claim 1, wherein the receptacle comprises a removable receptacle selectively receivable within the cutout of the base plate and having an open back open in a direction away from the trap and through which bait is placed into the receptacle, the cover closing the open back of the receptacle in the closed position.

4. The animal trap of claim 1, wherein the flange extends in a plane parallel to a plane defined by the front wall, the front wall being received through the cutout of the base plate and the rear wall opening with the flange abutting the base plate.

5. The animal trap of claim 1, wherein the cover defines an integral recess extending into the cover in a rearward direction away from the rear end of the trap with the cover in the closed position, the recess having an open front opening in a direction toward the trap with the cover in the closed position.

6. The animal trap of claim 5, wherein the receptacle is removable from the trap and separable from the cover, the receptacle selectively receivable within the cutout of the base plate and having an open back opening in a direction away from the trap and through which bait is placed, the cover closing the open back of the receptacle when the trap is in use.

7. The animal trap of claim 1, wherein the shared fastener includes a quarter-turn fastener.

8. The animal trap of claim 1, wherein the planar base plate includes a body with edge fasteners, distinct from the shared fastener, and securable to an adjoining wire mesh enclosure on a rear wall thereof.

9. The animal trap of claim 1, wherein the shared fastener is fixed to the cover independently of a state of engagement of the fastening end with the exposed wire, and the cover is hingedly attached to the base plate.

10. The animal trap of claim 1, wherein a mounting plate of the shared fastener is fixed to the base plate.

11. A bait apparatus mountable to an enclosure of a live animal trap, comprising:

a planar base plate including a cutout formed therethrough for mounting to the enclosure;

a removable receptacle in communication with the cutout of the base plate for holding a portion of bait, the receptacle including an apertured front wall, a sidewall extending at least partially around a perimeter of the front wall, and a flange extending outward from the sidewall on an end opposite the front wall; and a cover selectively securable on and directly flush simultaneously to the base plate and the removable receptacle for closing a side of the cutout and defining an integral recess extending into the cover in a rearward direction away from the base plate with the cover in a closed position relative to the base plate, the recess having an open front opening in a direction toward the base plate with the cover in the closed position, wherein:

the base plate and the cover each define a fastener opening formed therethrough;

the fastener openings of the base plate and the cover are aligned with the cover in the closed position and expose a wire of the enclosure therethrough;

a shared fastener extends through the cover and the base plate with the cover in the closed position, the shared fastener including a fastening end engaging with the exposed wire for securing the cover in the closed position;

the base plate defines a slot on a front face thereof opposite the fastener opening; and the cover defines a bent tab having a free end adapted to engage with and extend through the slot to a rear of the base plate for allowing the cover to move between the open and the closed position with the tab retained within the slot.

12. The bait apparatus of claim 11, wherein the receptacle is selectively receivable within the cutout of the base plate and having an open back through which bait is placed into the receptacle, the cover closing the open back of the receptacle with the cover in the closed position, the bent tab extends perpendicular to the base plate in the open position and extends parallel to the base plate in the closed position.

13. The bait apparatus of claim 11, wherein the flange extends in a plane parallel to a plane defined by the front wall, the front wall being received through the cutout of the base plate with the flange abutting the base plate independent of the position of the cover.

14. The bait apparatus of claim 11, wherein the base plate and the cover are hingedly connected.

15. The bait apparatus of claim 11, wherein the shared fastener is fixed to the cover.

16. The bait apparatus of claim 15, wherein the shared fastener is fixed to an outer side of the cover.

17. The bait apparatus of claim 11, wherein the receptacle is separable from the cover, the receptacle selectively receivable within the cutout of the base plate and having an open back opening toward the cover in the closed position such that the cover closes the open back of the receptacle.

18. The bait apparatus of claim 11, wherein the cover is movable between the closed position in which the cover is arranged over the cutout, and an open position in which the cutout is exposed to an external environment.

19. The bait apparatus of claim 11, wherein the planar base plate includes edge fasteners securable to wire mesh of the enclosure along a rear wall thereof.

20. A live catch animal trap comprising:
an animal enclosure having a trap body and an animal access opening facilitating entry into a vacant interior sized to receive an animal to be trapped;
an entry door movably mounted at the access opening, the entry door operative in an opened position to reveal the animal access opening and in a closed position to block the animal access opening;

a setting mechanism for fixing the door in the opened position;
a trip mechanism that when activated allows the door to move to the closed position; and
a bait apparatus mounted at a rear end of the trap and enabling a user to bait the trap without accessing the animal access opening, the bait apparatus including:
a planar base plate mounted to an exterior wall of the trap body, the base plate defining a cutout aligned with and secured over an opening in the exterior wall of the trap body; and
a planar cover selectively securable on and positioned directly flush to an exterior side of the planar base plate, the cover movable between a closed position in which the cover is arranged over the cutout and an open position in which the cutout is exposed to an external environment, the cover defining an integral recess extending into the cover in a rearward direction away from the rear end of the trap with the cover in the closed position, the recess having an open front opening in a direction toward the trap with the cover in the closed position, the integral recess defined by a back wall and a circumferential sidewall of the cover, with the cover in the closed position the sidewall extending from the back wall in a direction toward the trap and defining an open front opening in a direction toward the trap, wherein:
the base plate and the cover each define a fastener opening formed therethrough;
the fastener openings of the base plate and the cover are aligned with the cover in the closed position and expose a wire of the enclosure therethrough; and
a shared fastener extends through the cover and the base plate with the cover in the closed position, the shared fastener including a mounting plate fixed to the base plate, and a fastening end extending through the cover and engaging with the exposed wire for securing the cover in the closed position.

21. The animal trap of claim 20, wherein the planar base plate includes edge fasteners securable to wire mesh of the animal enclosure along a rear wall thereof.

* * * * *